US012241617B2

(12) United States Patent
Jarvis (10) Patent No.: US 12,241,617 B2
(45) Date of Patent: *Mar. 4, 2025

(54) PORTABLE LIGHT STAND

(71) Applicant: Moma Products Pty Ltd, Canning Vale (AU)

(72) Inventor: Michael Jarvis, Canning Vale (AU)

(73) Assignee: MOMA PRODUCTS PTY LTD (AU)

( * ) Notice: Subject to any disclaimer, the term of this patent is extended or adjusted under 35 U.S.C. 154(b) by 72 days.

This patent is subject to a terminal disclaimer.

(21) Appl. No.: 18/178,769

(22) Filed: Mar. 6, 2023

(65) Prior Publication Data

US 2023/0204196 A1 Jun. 29, 2023

Related U.S. Application Data

(63) Continuation of application No. 17/593,973, filed as application No. PCT/AU2019/051012 on Sep. 20, 2019, now Pat. No. 11,619,369.

(30) Foreign Application Priority Data

Apr. 4, 2019 (AU) .................................. 2019901158

(51) Int. Cl.
*F21V 21/06* (2006.01)
*F21W 131/103* (2006.01)
*E04H 12/22* (2006.01)

(52) U.S. Cl.
CPC .......... *F21V 21/06* (2013.01); *E04H 12/2246* (2013.01); *F21W 2131/103* (2013.01)

(58) Field of Classification Search
CPC ............ E04H 12/2246; E04H 12/2238; A63B 2071/026; F21S 9/037
See application file for complete search history.

(56) References Cited

U.S. PATENT DOCUMENTS 2,613,899 A * 10/1952 Wagner .................. A47G 33/12
248/527
3,794,279 A 2/1974 Kramer
(Continued)

FOREIGN PATENT DOCUMENTS

CN 206548625 U 10/2017
DE 20109706 U1 8/2001
(Continued)

OTHER PUBLICATIONS

Written Opinion of the International Searching Authority; Application No. PCT/AU2019/051012; Issued: Oct. 8, 2019; 6 Pages.
(Continued)

*Primary Examiner* — William N Harris
*Assistant Examiner* — James M Endo
(74) *Attorney, Agent, or Firm* — Husch Blackwell LLP (57) ABSTRACT

A fillable base for a portable light stand, the base including: a hollow structure made from moulded plastics material, the hollow structure having an upper portion and a lower portion with a generally circular footprint. The lower portion of the hollow structure has a substantially vertical cylindrical outer side wall, and the upper portion of the hollow structure has a conical outer side wall. The conical outer side wall has an outer edge extending from a top edge of the cylindrical side wall to an apex of the upper portion of the structure. The structure also has a recess that opens at the apex and within which one end of an elongate pole can be received.

13 Claims, 6 Drawing Sheets

(56) References Cited

U.S. PATENT DOCUMENTS

| | | | |
|---|---|---|---|
| 4,145,044 | A | 3/1979 | Wilson |
| 4,486,016 | A | 12/1984 | Rubin |
| 4,591,126 | A | 5/1986 | Berney |
| 4,976,411 | A | 12/1990 | Gordon |
| 5,158,281 | A | 10/1992 | Williams |
| 5,248,140 | A | 9/1993 | Mower et al. |
| 5,460,353 | A | 10/1995 | Rittenhouse |
| 5,624,358 | A | 4/1997 | Hestilow |
| 5,678,757 | A | 10/1997 | Martin |
| 5,779,215 | A | 7/1998 | Demasi |
| 5,944,413 | A | 8/1999 | Crookham et al. |
| 6,104,205 | A | 8/2000 | Mawby |
| 6,251,051 | B1 | 6/2001 | Chen |
| 6,299,124 | B1 * | 10/2001 | Reback ............... F16M 11/046 248/527 |
| 6,390,958 | B1 * | 5/2002 | Chu ..................... A63B 69/22 482/90 |
| 6,619,610 | B1 | 9/2003 | Genovese |
| 7,063,648 | B1 * | 6/2006 | Brigham ............ A63B 21/4037 248/910 |
| 7,588,387 | B1 | 9/2009 | Christensen |
| 7,704,194 | B1 | 4/2010 | Chen |
| 8,789,549 | B1 | 7/2014 | Barnes |
| 9,458,645 | B1 | 10/2016 | King |
| 11,619,369 | B2 * | 4/2023 | Jarvis ..................... F21V 21/06 362/410 |
| 2005/0023428 | A1 * | 2/2005 | Woude ............... E04H 12/2246 248/530 |
| 2009/0100789 | A1 | 4/2009 | Hornbeak |
| 2010/0034584 | A1 * | 2/2010 | Christensen ......... E01F 15/083 404/6 |
| 2010/0302764 | A1 | 12/2010 | Yu |
| 2011/0000132 | A1 | 1/2011 | Kamau |
| 2012/0168597 | A1 | 7/2012 | Hendrix |
| 2012/0312937 | A1 | 12/2012 | Weber |
| 2012/0314404 | A1 | 12/2012 | Harshaw |
| 2013/0027911 | A1 | 1/2013 | Nolle |
| 2015/0330613 | A1 | 11/2015 | Louden |
| 2016/0059100 | A1 | 3/2016 | Chen |
| 2019/0360229 | A1 * | 11/2019 | Vanderminden ....... A45B 23/00 |

FOREIGN PATENT DOCUMENTS

| | | |
|---|---|---|
| DE | 10036998 A1 | 2/2002 |
| WO | 2018158326 A1 | 9/2018 |

OTHER PUBLICATIONS

Written Opinion of the Preliminary Examining Authority; Application No. PCT/AU2019/051012; Issued: Jan. 15, 2021; 5 Pages.

Written Opinion of the Preliminary Examining Authority; Application No. PCT/AU2019/051012; Issued: Oct. 15, 2020; 5 Pages.

European Search Report dated Jul. 11, 2023 for European Application No. EP19922233.2.

Moma: "moma solar—The Original Pop-up Street Light," retrieved from the internet: https://cdn2.shopify.com/s/files/1/002 5/0567/0755/files/StreetLightPopUp-Brochure.pdf?7580. Jul. 1, 2019.

Momasolar: "Announcing: MOMA's Pop Up Solar Street Lights—Momasolar," retrieved from the internet: https://www.momasolar.com.au/blogs/moma-solar-news/announcing-momas-pop-up-solar-street-lights. Jul. 1, 2019.

* cited by examiner

PORTABLE LIGHT STAND

CROSS REFERENCE TO RELATED APPLICATIONS

This application is a continuation of U.S. patent application Ser. No. 17/593,973, filed Sep. 29, 2021, entitled "PORTABLE LIGHT STAND," which is a U.S. National Stage Entry of International Patent Application No. PCT/AU2019/051012, filed Sep. 20, 2019, entitled "PORTABLE LIGHT STAND," which claims priority to Australian Patent Application No. 2019901158, filed Apr. 4, 2019, entitled "PORTABLE LIGHT STAND," which are each incorporated herein by reference in their entireties.

TECHNICAL FIELD

The present teaching relates to a portable light stand and relates particularly, though not exclusively, to a portable light stand for a solar-powered light.

BACKGROUND

Street parties and social gatherings in public spaces are becoming increasingly popular in many urban centres, as people discover new ways of enjoying social occasions and celebrations in an urban environment. It is not uncommon for such occasions and events to continue into the evening and night hours, after dark. In some contexts, there is a need for temporary street lighting, and therefore some municipalities have been providing temporary street lighting powered by diesel generators so that the festivities can continue after dark. More recently, low-powered LED floodlights and improved battery technology have made solar-powered temporary street lighting more feasible.

Prior art temporary street lighting generally employs a concrete base, which is extremely heavy and has to be lifted and placed in position using a crane.

The present teaching was developed with a view to filling the need for a simple pop-up solar-powered streetlight that can be quickly and easily deployed. However, it will be appreciated that the fillable base, originally designed for the pop-up solar-powered streetlight, may have several other uses, including serving as a temporary base for other kinds of vertically upright poles and stands, such as a flagpole, banner stand, tent pole, traffic signals, traffic signage, traffic speed indicator, security cameras, and electrical lights etc.

References to prior art in this specification are provided for illustrative purposes only and are not to be taken as an admission that such prior art is part of the common general knowledge in Australia or elsewhere.

SUMMARY

According to one aspect of the present teaching there is provided a fillable base for a portable light stand, the base comprising:
  a hollow structure made from moulded plastics material, the hollow structure having an upper portion and a lower portion with a generally circular footprint, the lower portion of the hollow structure having a substantially vertical cylindrical outer side wall, and the upper portion of the hollow structure having a conical outer side wall, the conical outer side wall having an outer edge extending from a top edge of the cylindrical side wall to an apex of the upper portion of the structure, the structure also comprising a recess that opens at the apex and within which one end of an elongate pole can be received, the hollow structure being of a height of more than 100 mm wherein, in use, the base provides sufficient ballast when filled with a filler material to keep a solar-powered fixture supported on the pole upright in windy conditions.

Preferably the substantially vertical cylindrical outer side wall is angled at between 0° and 5° to the vertical. Typically the hollow structure has a height of between 1000 and 1300 mm.

Typically, the conical outer side wall is angled at between 60° and 30° to the vertical. Typically, the lower portion of the hollow structure has a substantially circular footprint with a maximum diameter of between 1050 and 1190 mm.

Advantageously the lower portion of the hollow structure further comprises a conical inner side wall that is angled at substantially the same angle to the vertical as the conical outer side wall of the upper portion of the hollow structure wherein, in use, one of the bases can be more easily stacked on top of another similar base.

Preferably the recess that opens at the apex of the hollow structure extends all the way through the hollow structure along a central vertical axis of the hollow structure to the conical inner side wall.

Preferably the upper portion of the hollow structure is provided with a fill aperture in the conical outer side wall for filling the hollow structure with a suitable filler material.

Preferably the hollow structure is fillable with water, and the fill aperture is provided with a recessed cap for sealing the aperture after filling. Typically, the fill aperture is one of two fill apertures provided in the conical outer side wall for filling the hollow structure with water. Preferably the lower portion of the hollow structure is provided with a drain aperture adjacent a lower edge of the substantially vertical cylindrical outer side wall for draining the hollow structure of water. Preferably the drain aperture is provided with a recessed cap for sealing the aperture after draining or prior to filling.

Advantageously the hollow structure is also provided with two or more moulded handles provided in the substantially vertical cylindrical outer side wall to assist with lifting the base manually.

Preferably the hollow structure is also provided with a pair of rectangular apertures moulded into a lower surface of the base, the apertures extending as parallel channels across a full width of the lower portion of the base, and being sized to receive the tines of a forklift truck.

According to another aspect of the present teaching there is provided a solar-powered pop-up fixture, the fixture comprising:
  a base having a hollow structure made from moulded plastics material, the hollow structure having an upper portion and a lower portion with a generally circular footprint having a diameter of more than 1000 mm, the lower portion of the hollow structure having a substantially vertical cylindrical outer side wall, and the upper portion of the hollow structure having a conical outer side wall, the conical outer side wall having an outer edge extending from a top edge of the cylindrical side wall to an apex of the upper portion of the hollow structure, the hollow structure also comprising a recess that opens at the apex, the hollow structure having a height of more than 1000 mm;
  an elongate pole having a bottom end received in the recess that opens at the apex; and,
  a solar-powered fixture mounted at a top end of the pole wherein, in use, the base provides sufficient ballast when filled with a filler material to keep the solar-powered fixture supported on the pole upright in windy conditions.

Throughout the specification, unless the context requires otherwise, the word "comprise" or variations such as "comprises" or "comprising", will be understood to imply the inclusion of a stated integer or group of integers but not the exclusion of any other integer or group of integers. Likewise, the word "preferably" or variations such as "preferred", will be understood to imply that a stated integer or group of integers is desirable but not essential to the working of the present teaching.

BRIEF DESCRIPTION OF THE DRAWINGS

The nature of the present teaching will be better understood from the following detailed description of several specific embodiments of a base for a light stand, given by way of example only, with reference to the accompanying drawings, in which.

DETAILED DESCRIPTION

Figure 1:
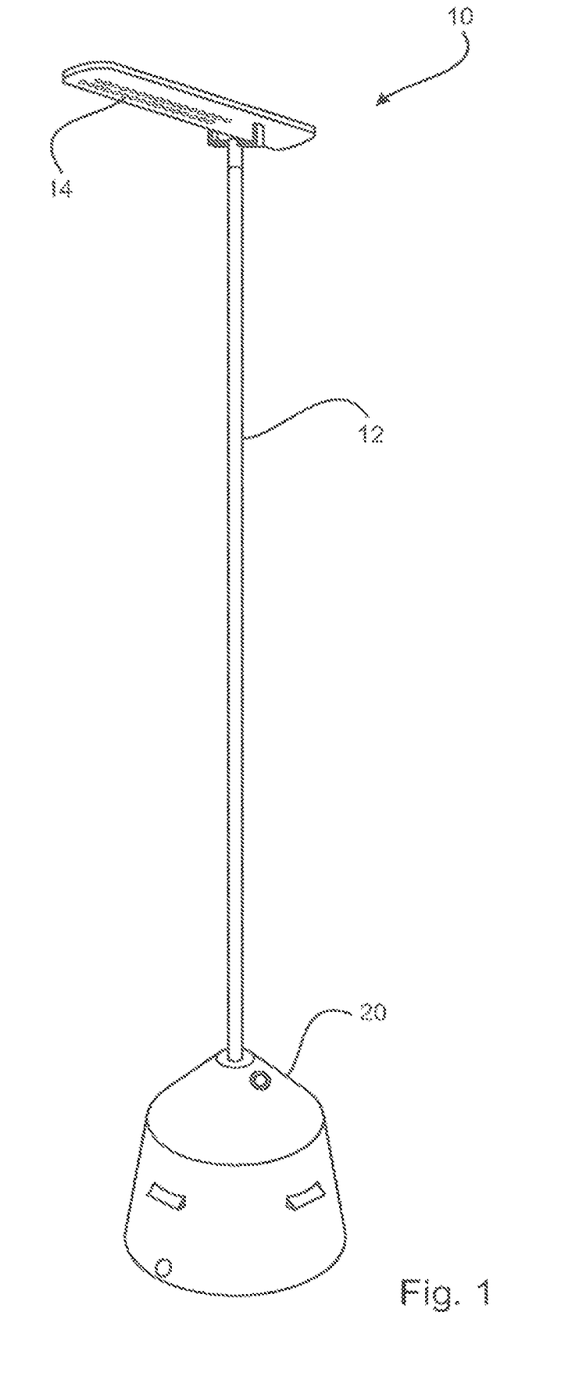
FIG. 1 is a side perspective view of a first embodiment of a solar-powered streetlight in accordance with the present teaching.

A preferred embodiment of a solar-powered streetlight 10 in accordance with the present teaching, as illustrated in FIG. 1, comprises a fillable base 20, with a light pole 12 mounted thereon and a solar-powered light 14 mounted at the top of the light pole. The solar-powered light 14 is preferably a MOMA LED in-house designed light with built-in Li-Ion battery and solar panel. Optionally the solar-powered light 14 may also have a PIR motion sensor built-in to save power in the absence of activity. Typically, a 40 W or 60 W MOMA solar-powered light is employed, which typically provides 5 hours of 100% brightness +5 hours of PIR 30% brightness & 70% brightness until dawn.

The light pole 12 is typically a hollow steel or aluminium pole received in a recess provided at the apex of the base 20.

Other features may be provided in association with the solar-powered streetlight 10, such as security devices and security cameras, as required. Alternatively, the solar-powered light 14 may be replaced with other kinds of solar-powered fixtures, such as traffic signals, traffic signage, traffic speed indicator, security camera, etc.

The solar-powered light 14 may also be fitted with bird-repellent, such as sharp upwardly pointing spikes on top (not shown), to prevent birds from perching on the light.

A first embodiment of the fillable base 20 for a portable light stand will now be described with reference to FIGS. 2 to 7. The fillable base 20 comprises a hollow structure 22 made from moulded plastics material. Preferably the hollow structure is manufactured using a rota-moulding technique, however other well-known plastics moulding techniques may be employed. The hollow structure 22 is typically manufactured from a suitable thermoplastic material, for example, Medium Density Polyethylene (MDPE), or High-Density Polyethylene (HDPE). The wall thickness of the hollow structure 22 is typically between 5 mm and 10 mm, more typically around 8 mm.

The hollow structure 22 has an upper portion 24 and a lower portion 26 (see FIG. 4) with a generally circular footprint. The lower portion 26 of the hollow structure 22 has a substantially vertical cylindrical outer side wall 28, and the upper portion 24 of the hollow structure 22 has a conical outer side wall 30. The conical outer side wall 30 has an outer edge 32, and extends from a top edge 34 of the cylindrical side wall 28 to an apex 36 of the upper portion 24 of the hollow structure 22.

Figure 4:
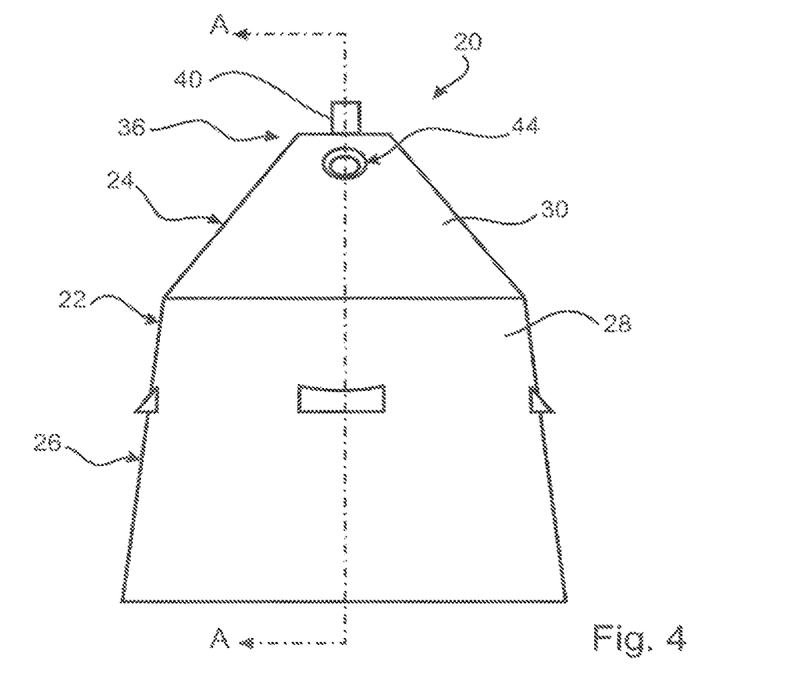
FIG. 4 is a front elevation of the base of FIG. 2.

Preferably the substantially vertical cylindrical outer side wall 28 is angled at between 0° and 5° to the vertical. More typically the substantially vertical cylindrical outer side wall 28 is angled at between 0.1° and 1° to the vertical. Typically, the conical outer side wall 30 is angled at between 60° and 30° to the vertical. More typically the conical outer side wall 30 is angled at between 50° and 40° to the vertical. The angled side walls of the base not only allow rainwater to flow freely off the base, so that it is self-cleaning, they also discourage people and animals from climbing or perching on the base.

The hollow structure 22 also comprises a recess 38 that opens at the apex 36 and within which one end of an elongate pole, such as the light pole 12 can be received.

Typically, the recess 38 has a length of HDPE poly pipe 40 moulded-in to the recess, with a slit to allow the poly pipe to clamp against a light pole received in the recess. A pipe clamp (not shown) may be used to clamp the light pole 12 in the recess 38.

Figure 5:
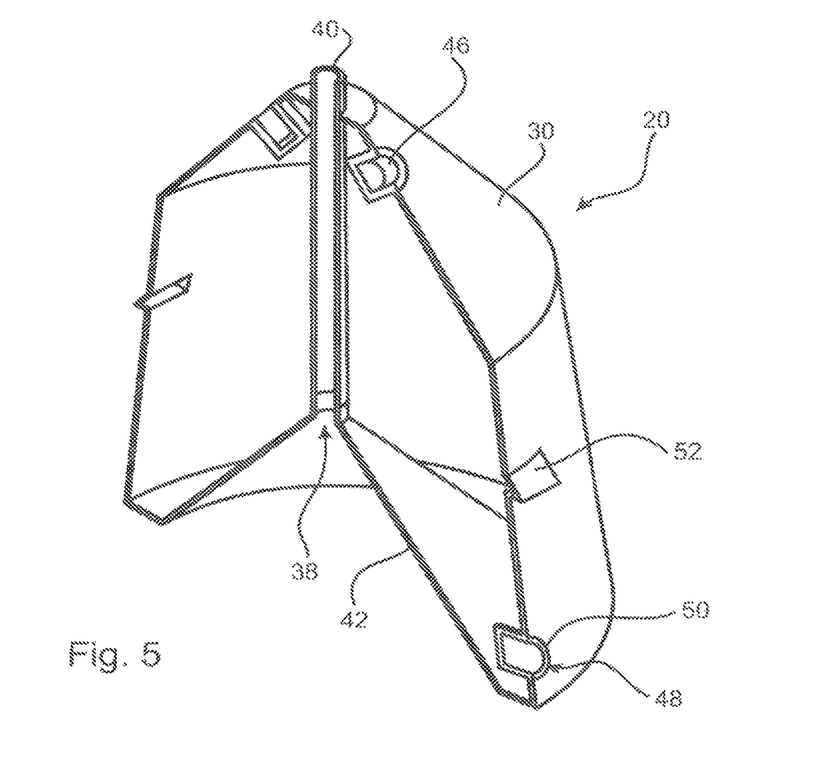
FIG. 5 is a section view through the line A-A in FIG. 4.
Figure 6:
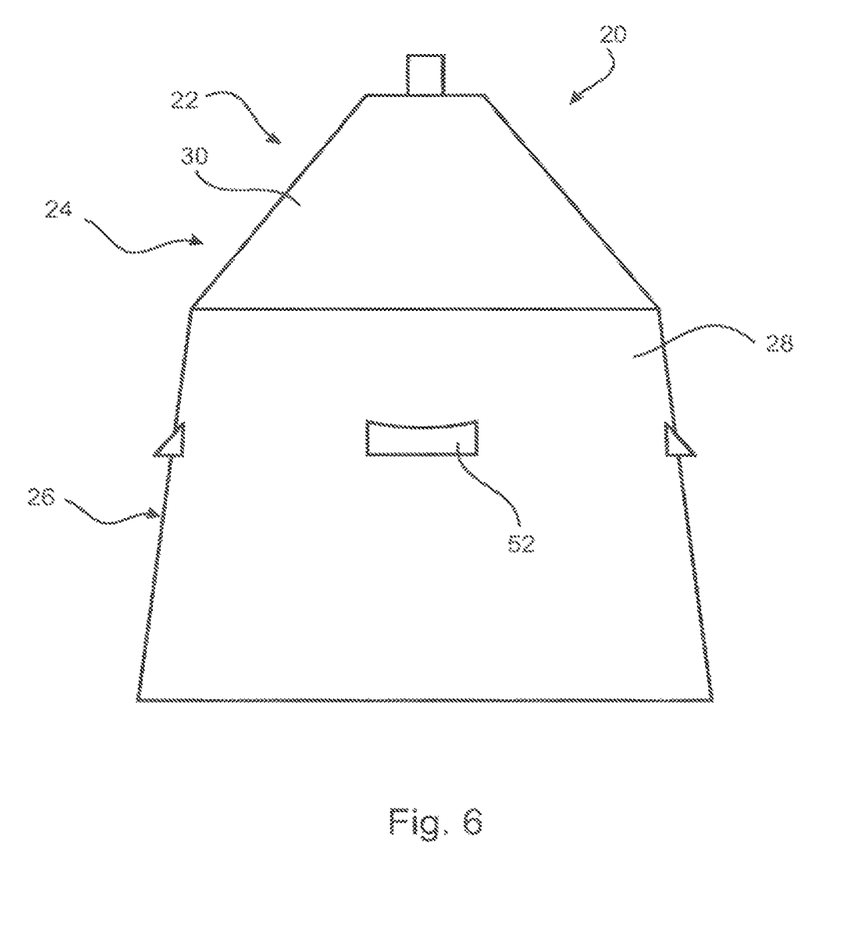
FIG. 6 is a side elevation of the base of FIG. 2.

Advantageously the lower portion 26 of the hollow structure 22 further comprises a conical inner side wall 42, as can be seen most clearly in FIG. 5. The conical inner side wall 42 is angled at substantially the same angle to the vertical as the conical outer side wall 30 of the upper portion 24 of the hollow structure 22 so as to form a concave cone-shaped recess in the underside of the base 20. In use, one of the bases 20 can be more easily stacked on top of another similar base 20', as the conical outer side wall 30 of the upper portion 24 of the other similar base 20' can be received within the concave cone-shaped recess formed by conical inner side wall 42 of the lower portion 26 of the base 20.

Preferably the recess 38, which opens at the apex 36 of the hollow structure 22, extends all the way through the hollow structure along a central vertical axis of the hollow structure to the conical inner side wall 42.

Figure 2:
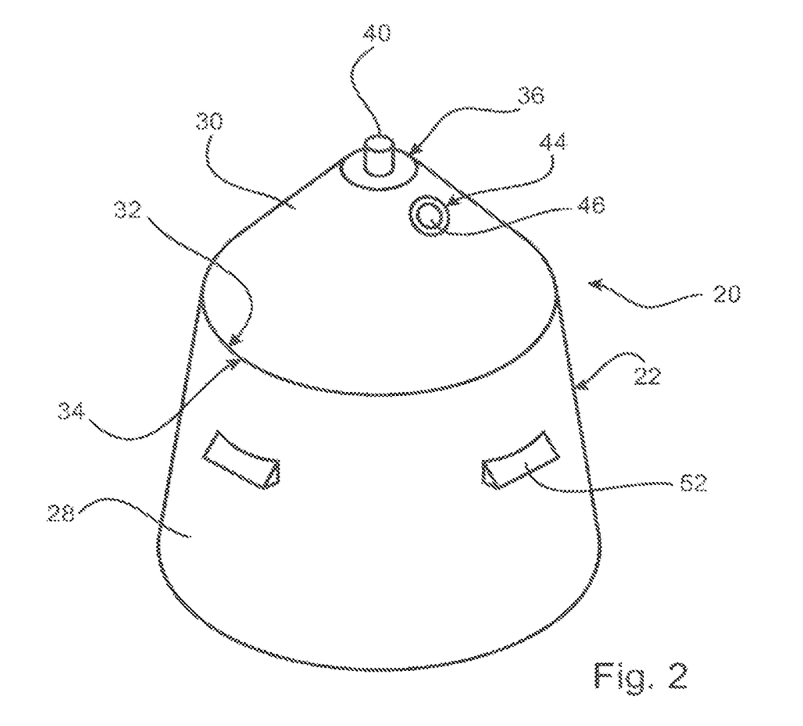
FIG. 2 is an isometric view of a first embodiment of a base for the solar-powered streetlight of FIG. 1.
Figure 3:
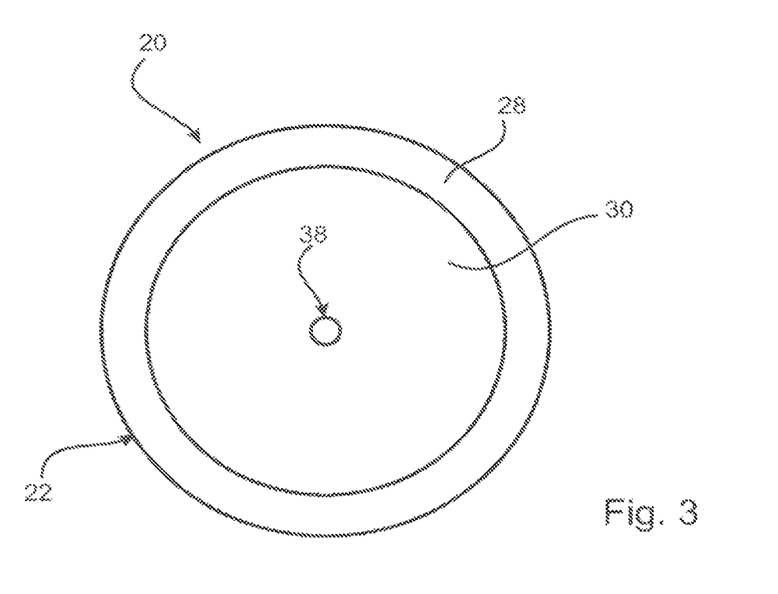
FIG. 3 is a top plan view of the base of FIG. 2.

Preferably the upper portion 24 of the hollow structure 22 is provided with a fill aperture 44 in the conical outer side wall 30 for filling the hollow structure 22 with a suitable filler material. Preferably the hollow structure 22 is fillable with water, and the fill aperture 44 is provided with a recessed cap 46 for sealing the aperture 44 after filling. Typically, the fill aperture 44 is one of two fill apertures provided in the conical outer side wall 30 for filling the hollow structure 22 with water. Preferably the lower portion 26 of the hollow structure 22 is provided with a drain aperture 48 adjacent a lower edge of the substantially vertical cylindrical outer side wall 28 for draining the hollow structure 22 of water. Preferably the drain aperture 48 is provided with a recessed cap 50 for sealing the aperture 48 after draining or prior to filling.

Advantageously the hollow structure is also provided with two or more moulded handles 52 provided in the substantially vertical cylindrical outer side wall 28 to assist with lifting the base 20 manually.

Figure 7:
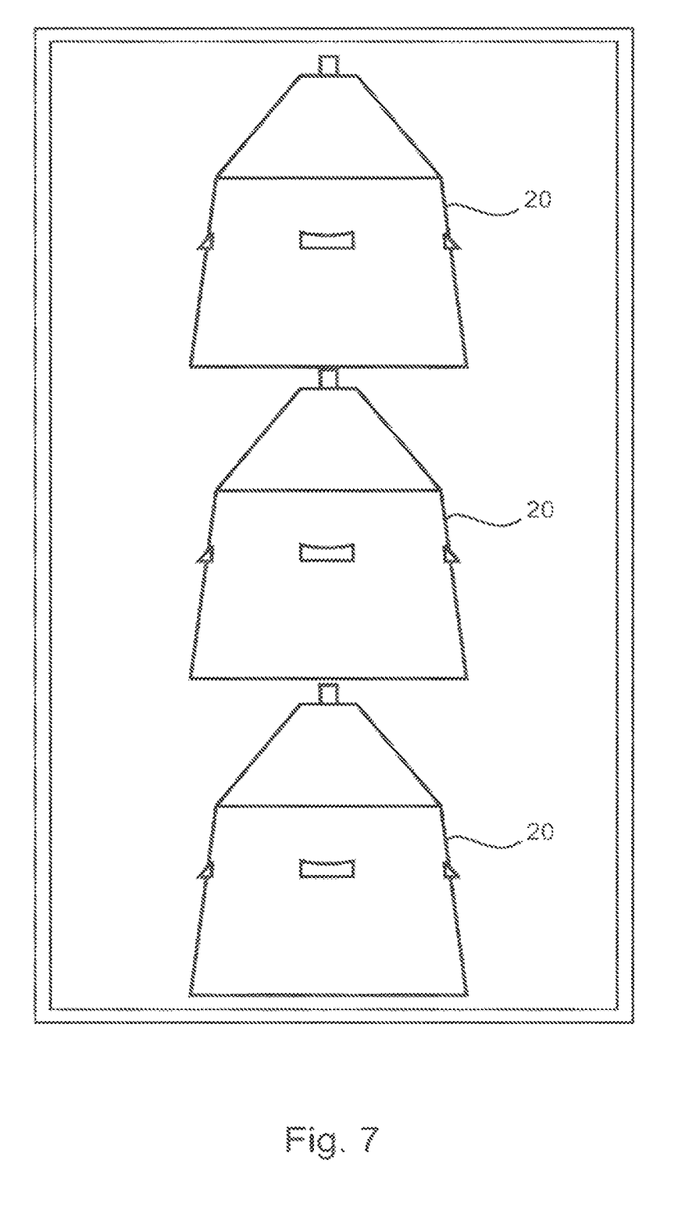
FIG. 7 illustrates the arrangement of three of the bases of FIG. 2 mounted in a rota mould carriage frame (mould not shown)

In the illustrated embodiment of the base 20, the hollow structure 22 has a height of 1217 mm, the upper portion 24 being 420 mm high and the lower portion 26 being 797 mm high. With the moulded-in length of poly pipe the total height of the base 20 is 1300 mm. Advantageously three of the bases 20 can be mounted end to end in a rota moulding frame, as shown in FIG. 7. The maximum outside diameter of the base 20 is 1050 mm, and the minimum outside diameter of the substantially vertical cylindrical outer side wall 28 is 854 mm. Both the flush mounted fill aperture 44 and flush mounted drain aperture 48 are 50 mm in diameter, and are fitted with a cap installed with spin weld thread. The hollow structure can contain about 580 L of water when filled (580 kg), but only weighs 30 kg when empty.

Figure 8:
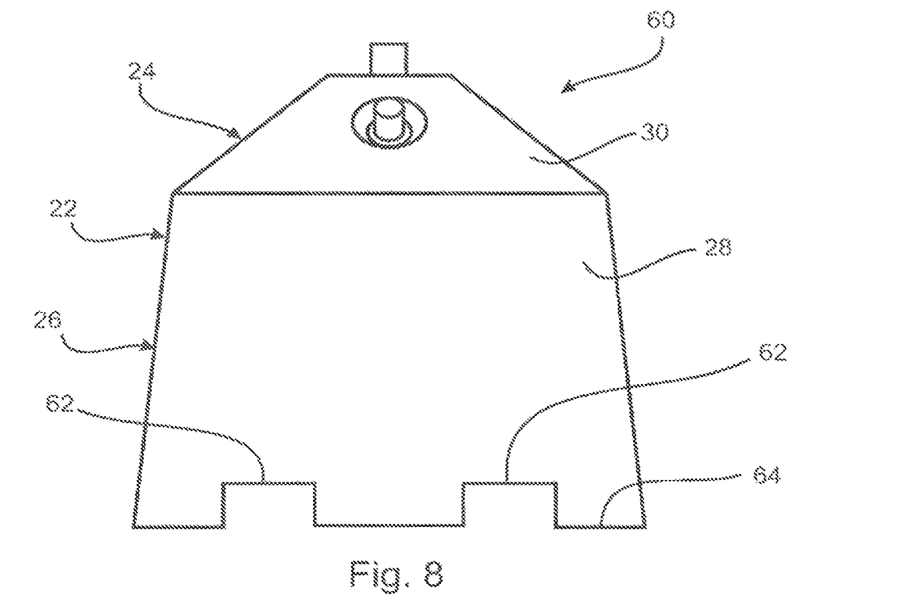
FIG. 8 is a side elevation of a second embodiment of a fillable base for a portable light stand in accordance with the present teaching; and, FIG. 9 is an isometric view of the fillable base of FIG. 8.
Figure 9:
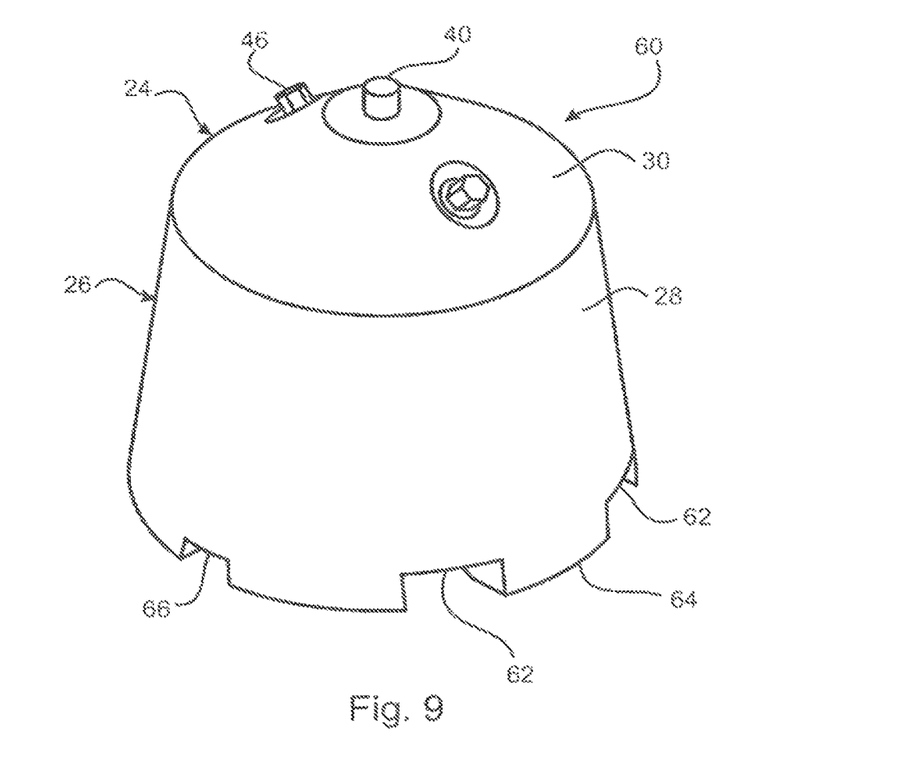

A second embodiment of the fillable base 60 for a portable light stand will now be described with reference to FIGS. 8 and 9. The fillable base 60 is similar to the fillable base 20 of the first embodiment, and therefore the like parts will be identified using the same reference numerals and will not be described again in detail. The fillable base 60 comprises a hollow structure 22 made from moulded plastics material. Preferably the hollow structure is manufactured using a rota-moulding technique, as per the fillable base 20.

The hollow structure 22 has an upper portion 24 and a lower portion 26 with a generally circular footprint. The lower portion 26 of the hollow structure 22 has a substantially vertical cylindrical outer side wall 28, and the upper portion 24 of the hollow structure 22 has a conical outer side wall 30. Preferably the substantially vertical cylindrical outer side wall 28 is angled at between 0° and 5° to the vertical, as per the fillable base 20. However, in this embodiment the conical outer side wall 30 is angled at between 80° and 30° to the vertical. More typically the conical outer side wall 30 is angled at between 70° and 60° to the vertical. The result is that this embodiment of the fillable base 60 is about 150 mm shorter in overall height, and therefore has a more squat appearance, than the first embodiment of the fillable base 20. In this embodiment of the base 60, the hollow structure 22 has a height of 1067 mm, the upper portion 24 being 270 mm high and the lower portion 26 being 797 mm high. With the moulded-in length of poly pipe the total height of the base 60 is 1150 mm.

In the first embodiment of the base 20 the hollow structure 22 is provided with two or more moulded handles 52 provided in the substantially vertical cylindrical outer side wall 28 to assist with lifting the base 20 manually. The handles 52 are provided intermediate the height of the side wall 28 on opposite sides of the lower portion 26. In the second embodiment of the base 60 two or more handles 66 are provided in the outer side wall 28, recessed into a lower edge 64 of the outer side wall 28 (see FIG. 9).

Advantageously, this embodiment of the fillable base 60 is also provided with a pair of rectangular apertures 62 moulded into a lower surface of the base. The apertures 62 extend as parallel channels across a full width of the lower portion 26 of the base 60, and are sized to receive the tines of a forklift truck, so that the base can be more easily lifted and moved when filled.

In other respects, the fillable base 60 of this embodiment is substantially identical as the first embodiment of the fillable base 20, and will not be described again in detail here.

Now that preferred embodiments of the solar-powered streetlight and base for a light stand have been described in detail, it will be apparent that the described embodiments provide a number of advantages over the prior art, including the following:

(i) The base for the light stand is stackable for transport purposes.
(ii) The base is advantageously less than 1150 mm in diameter and will fit a standard transport pallet of 1190 mm width. A typical tray of a truck is 2390 mm wide, so two rows of stacked bases can be transported side by side.
(iii) The solar-powered streetlights are engineered for Category A winds, with the base providing sufficient ballast to keep the light pole upright.
(iv) The base is easily fillable and drainable on site.
(v) When emptied of water the base is easily lifted manually and can be carried by two people for installation or relocation.
(vi) When filled with water the base can be easily lifted using a forklift truck, by inserting the tines in the apertures provided for this purpose.
(vii) No cranes or heavy lifting machinery are normally required to install the solar-powered streetlights.
(viii) The base has a small environmental footprint as it runs without fossil fuel generators and electrical outputs from generators to lighting towers and fully operates within a no sound environment.

It will be readily apparent to persons skilled in the relevant arts that various modifications and improvements may be made to the foregoing embodiments, in addition to those already described, without departing from the basic inventive concepts of the present teaching. For example, in the illustrated embodiment the moulded handles protrude from the side wall of the lower portion of the hollow structure, however the handles can be recessed instead of protruding to keep them inside the base diameter, and the number and shape of the handles can also be varied from that shown. One or more of the moulded handles can also be replaced with barrier connecting points. Therefore, it will be appreciated that the scope of the present teaching is not limited to the specific embodiment described.

The invention claimed is:

1. A portable pole base that is fillable and that in use supports an elongate pole having a solar-powered electronic device mounted thereon, the base comprising:
   a hollow structure made from moulded plastics material that can be filled with a filler material, the hollow structure having:
      an upper portion and a lower portion with a generally circular footprint, the lower portion of the hollow structure having a substantially vertical cylindrical outer side wall, and the upper portion of the hollow structure having a conical outer side wall, the conical outer side wall having an outer edge extending from a top edge of the cylindrical outer side wall to an apex of the upper portion of the hollow structure, wherein the lower portion of the hollow structure further includes a conical inner side wall that is angled at substantially the same angle to the vertical as the conical outer side wall of the upper portion of the hollow structure, wherein, in use, one of the bases can be more easily stacked on top of another similar base;
      a recess that opens at the apex and configured to receive and support one end of the elongate pole, the recess extending all the way through the hollow structure along a central vertical axis of the hollow structure, wherein the vertical axis is central relative a plan view of the hollow structure;

a protrusion formed on the outer surface and that defines a part of the opening of the recess and that is dimensioned so that when the elongate pole is received in the recess the elongate pole can be secured to the protrusion with a clamp;

a fill aperture located in the conical outer side wall for filling the hollow structure with a suitable filler material;

a drain aperture adjacent a lower edge of the substantially vertical cylindrical outer side wall for draining the hollow structure of water; and a pair of channels molded into a lower surface of the base that are sized to receive tines of a forklift truck.

2. The fillable base for the portable light stand as defined in claim 1, wherein the substantially vertical cylindrical outer side wall is angled at between 0° and 5° to the vertical.

3. The fillable base for the portable light stand as defined in claim 1, wherein the hollow structure has a height of between 1000 and 1300 mm.

4. The fillable base for the portable light stand as defined in claim 1, wherein the conical outer side wall is angled at between 80° and 30° to the vertical.

5. The fillable base for the portable light stand as defined in claim 1, wherein the lower portion of the hollow structure has a substantially circular footprint with a maximum diameter of between 1050 and 1190 mm.

6. The fillable base for the portable light stand as defined in claim 1, wherein the hollow structure can contain 580 L is fillable with water.

7. The fillable base for the portable light stand as defined in claim 1, wherein the fill aperture is one of two fill apertures provided in the conical outer side wall for filling the hollow structure with water.

8. The fillable base for the portable light stand as defined in claim 1, wherein the drain aperture is provided with a recessed cap for sealing the drain aperture after draining or prior to filling.

9. The fillable base for the portable light stand as defined in claim 1, wherein the hollow structure is also provided with two or more molded handles provided in the substantially vertical cylindrical outer side wall to assist with lifting the base manually.

10. The fillable base for a portable light stand as defined in claim 1, wherein the pair of channels molded into a lower surface of the base extend as parallel channels across a full width of the lower portion of the base.

11. The fillable base for the portable light stand as defined in claim 1, wherein the hollow structure has a wall thickness of between 5 mm and 10 mm.

12. The fillable base for the portable light stand as defined in claim 1, wherein the fill aperture is provided with a recessed cap for sealing the aperture.

13. A portable pole base that is fillable and that in use supports an elongate pole having a solar-powered electronic device mounted thereon, the portable pole base comprising:

a hollow structure made from moulded plastics material that can be filled with a filler material, the hollow structure having:

an outer surface;

a recess that has an opening in the outer surface and configured to receive one end of the elongate pole, wherein the recess is isolated from a region of the hollow structure that is fillable with the filler material, the recess extends as a channel through the hollow structure along a vertical axis of the hollow structure, wherein the vertical axis is central relative a plan view of the hollow structure, wherein the lower portion of the hollow structure further includes a conical inner side wall that is angled at substantially the same angle to the vertical as the conical outer side wall of the upper portion of the hollow structure, wherein, in use, one of the bases can be more easily stacked on top of another similar base, wherein the lower portion of the hollow structure has a substantially circular footprint with a maximum diameter of between 1050 and 1190 mm;

a protrusion formed on the outer surface and that defines a part of the opening of the recess and that is dimensioned so that when the elongate pole is received in the recess the elongate pole can be secured to the protrusion with a clamp; and a fill aperture spaced from where the recess opens onto the outer surface, wherein the fill aperture is for filling the hollow structure with the filler material;

a drain aperture located in the outer surface adjacent a lower edge of the hollow structure for emptying the hollow structure of the filler material;

a pair of channels moulded into a lower surface of the base that are sized to receive tines of a forklift truck.

* * * * *